United States Patent
Assemaly Salama et al.

(10) Patent No.: US 10,382,504 B2
(45) Date of Patent: *Aug. 13, 2019

(54) CONDUCTING A CONFERENCE CALL OVER A COMPUTER NETWORK

(71) Applicant: International Business Machines Corporation, Armonk, NY (US)

(72) Inventors: Hitham A. Assemaly Salama, Blanchardstown (IE); Diaa Eldin Ali Mohamed Mahmoud, Doha (QA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,455

(22) Filed: Nov. 3, 2017

(65) Prior Publication Data

US 2018/0124132 A1    May 3, 2018

Related U.S. Application Data

(63) Continuation of application No. 14/963,728, filed on Dec. 9, 2015, now Pat. No. 9,813,464.

(51) Int. Cl.
*H04L 29/06* (2006.01)
*H04L 29/12* (2006.01)

(52) U.S. Cl.
CPC ........ *H04L 65/403* (2013.01); *H04L 61/2007* (2013.01); *H04L 65/1066* (2013.01); *H04L 65/1086* (2013.01); *H04L 65/80* (2013.01)

(58) Field of Classification Search
CPC ............... H04L 65/403; H04L 65/1066; H04L 65/1086; H04M 3/56
See application file for complete search history.

(56) References Cited

U.S. PATENT DOCUMENTS 7,002,919 B1   2/2006 El-Sayed
7,353,255 B2   4/2008 Acharya et al.
(Continued)

FOREIGN PATENT DOCUMENTS

WO   2015081425 A1   6/2015

OTHER PUBLICATIONS

Assem, H. et al., "Imonitoring VoIP Call Quality Using Improved Simplified E-Model," [online] In IEEE Int'l. Conf. on Computing, Networking and Communications (ICNC), 2013, pp. 927-931, 2013, retrieved from the Internet: <http://eprints.maynoothuniversity.ie/5965/1/DM-Monitoring-VoIP.pdf>.
(Continued)

*Primary Examiner* — Rhonda L Murphy
(74) *Attorney, Agent, or Firm* — Cuenot, Forsythe & Kim, LLC

(57) ABSTRACT

A computer-implemented method, system and computer program product for a conference call moderator to conduct a conference call between a plurality of participants. At least some of the conference call participants are grouped by location. A participant within each group is identified to act as a domestic focus for that group and is notified of its assigned role. For each group, the conference call moderator disconnects from all participants in the group except for the participant that has been assigned the role of domestic focus. For each group, the conference call is then routed through the assigned domestic focus. Such a grouping may, for example, occur as a result of a degradation in call quality or may be based on the number of call participants. This solution preferably off-loads some of the conference call processing to the domestic focus, thereby alleviating the workload faced by the overall conference call moderator.

20 Claims, 15 Drawing Sheets

(56) References Cited

U.S. PATENT DOCUMENTS

| | | | |
|---|---|---|---|
| 8,126,129 | B1 | 2/2012 | McGuire |
| 9,813,464 | B2 | 11/2017 | Salama et al. |
| 2008/0247382 | A1 | 10/2008 | Verma et al. |
| 2010/0198648 | A1* | 8/2010 | Bank ............... G06Q 10/06311 705/7.19 |
| 2013/0279677 | A1 | 10/2013 | Beerse et al. |
| 2015/0181165 | A1* | 6/2015 | Iltus ..................... H04N 7/15 348/14.09 |
| 2016/0344567 | A1* | 11/2016 | Navale ............... H04L 12/1822 |

OTHER PUBLICATIONS

Bayley, T., et al., "Call quality monitoring for VoIP," [online] In 5th Int'l. Conf. on Signal Processing and Communication Systems (ICSPCS), Dec. 12-14, 2011, retrieved from the Internet: < http://ieeexplore.ieee.org/xpl/login.jsp?tp=&arnumber=6140825&url=http%3A%2F%2Fieeexplore.ieee.org%2Fxpls%2Fabs_all.jsp%3Farnumber%3D6140825>, 4 pg.

Adel, M. et al., "Improved E-model for monitoring quality of multi-party VoIP communications," [online] In 2013 IEEE Globecom Workshops (GC Wkshps), pp. 1180-1185, Dec. 9-13, 2013, retrieved from the Internet: <http://ieeexplore.ieee.org/xpl/login.jsp?tp=&arnumber=6825153&url=http%3A%2F%2Fieeexplore.ieee.org%2Fxpls%2Fabs_all.jsp%3Farnumber%3D6825153>.

"Polycom: Video Conference, Voice Conferencing, Telepresence," [online] Polycom, Inc. © 2015 [retrieved Dec. 9, 2015] retrieved from the Internet: <http://www.polycom.com/>, 4 pg.

IBM: List of IBM Patents or Patent Applications Treated as Related, 2 pg.

Salama et al., "Conducting a Conference Call Over a Computer Network," U.S. Appl. No. 14/963,728, filed Dec. 9, 2015, 36 pages (A copy is not provided as this application is available to the Examiner.

* cited by examiner

CONDUCTING A CONFERENCE CALL OVER A COMPUTER NETWORK

BACKGROUND

The present invention relates generally to conducting conference calls over a computer network. More specifically, the present invention is concerned with conducting conference calls where the number of participants is likely to affect call quality.

With today's interconnected world, Voice over IP (VoIP) has become one of the most rapidly growing technologies in telecommunications. Although VoIP is in general much cheaper than traditional dedicated telephone lines, VoIP as a technology is very resource intensive in terms of the number of data packets that need to be transferred over a network in order to run a single call. This vast amount of data represents a high traffic load on any network and eventually consumes a considerable part of the available bandwidth of the network. Thanks to the increasing processing power and memory availability in modern servers, it has become feasible to encode VoIP data packets using very sophisticated codecs to highly compress the data. This means that it is possible to save on transmission bandwidth without trading off on call quality. However, this has led to the wide availability and much reduced cost of VoIP services. This has attracted many more users than before to use such services and this places extra stress on the data networks being used.

VoIP performance depends on a number of network-related factors (parameters), including available bandwidth, end to-end delay, packet loss and jitter. Variance in these parameters often leads to degradation of VoIP performance and the Quality-of-Experience (QoE) or Quality of Service (QoS) perceived by end users. Moreover, other than network issues, application specific factors like the choice of codec, codec parameters, and jitter buffer sizing also impact QoE. It is important for implementers of VoIP applications to assess QoE as perceived by the end user and take mitigating actions when it degrades to unacceptable levels. Mean Opinion Score (MOS) is the commonly accepted metric to measure the QoE of a call as perceived directly by the end user—it encapsulates the effects of both network and implementation specific issues.

In recent years VoIP has become an extremely important application class, with VoIP clients being very widely used by businesses and individuals. The success achieved by the basic two-party VoIP communications in terms of reliability and the cutting of costs has encouraged the emergence of multi-party VoIP conferencing facilities. Intuitively, it is more difficult to ensure QoE in multi-party sessions since at different times during a session, different people, connecting via different network paths, will be speaking.

The Session Initiation Protocol (SIP), used by the majority of VoIP applications, supports establishment of communications sessions with multiple participants. Nevertheless, VoIP applications have considerable flexibility in how VoIP sessions are realized. Currently, VoIP conferences are implemented through three possible connection topologies: Decentralized, Centralized, and Hybrid. The Centralized model is one of the models commonly used in designing VoIP multi-party conferencing systems. Each endpoint is connected directly to the focus (moderator), and it has no current knowledge of other connections between other endpoints and the focus. Multiple links to the focus are often subjected to different degradation factors. A centralized model is based on a central point of control called a focus or the Multi Control Unit (MCU). The MCU is typically responsible for SIP signaling between all the conference endpoints. Moreover, all the transmitted audio data in the conference call must pass first through the focus to be decoded, mixed (if more than one user is speaking) and finally re-encoded and sent to the rest of the endpoints.

When the number of the conference call participants is small e.g., just a few people, usually the call quality is excellent or the best that could be achieved based on the current system and network capabilities. However, when the number of participants starts to grow, e.g., in the case of educational sessions, all-hands meetings, remote round table meetings, etc., the system and network resources may become overloaded such that it is not feasible to maintain the same call quality. Quality of Service (QoS) would therefore be reduced which could cause call troubles and eventually user dissatisfaction.

SUMMARY

There is provided a computer-implemented method, system and computer program product for a conference call moderator to conduct a conference call between a number of participants. At least some of the conference call participants are grouped by location and one participant is then identified within each group to act as a domestic focus for that group. Each domestic focus is notified of their assigned role. For each group, the call moderator disconnects from all participants in that group, except for the participant that has been assigned the role of domestic focus. The call moderator then routes the conference call through the domestic focuses and each domestic focus communicates with the participants in their group.

This is advantageous because previously one moderator (focus) would typically receive each participant's audio stream and then have the role of gathering all streams, encoding and compressing them and sending them combined to all participants. The participants would typically decode such information and thus be able to hear what all the others on the conference call were saying. This is a huge overhead being borne by the moderator which could lead to very congested streams and might thus cause call quality to suffer at any point in time. It is the domestic focus that preferably now performs the main elements of conference call processing such as coding, decoding and modulation. This helps to alleviate the processing (over)load that the call moderator may otherwise suffer from as a result of a large number of call participants.

By way of example, there might be 10 domestic focuses (sub moderators). Each domestic focus will send a combined stream for his group to the moderator of the whole conference call. Rather than having one moderator receiving 100 streams from all participants, the moderator will now receive only 10 streams.

It will be appreciated that certain participants may not be appropriately located such that they fall within one of the newly created groups.

Location is an important factor to take into account when grouping because sending quality can be affected significantly by delay and delay can be affected by the distance between participants.

In one embodiment, conference call quality is monitored and a degradation (drop) in call quality is the trigger which causes at least some participants to be grouped by location. A drop in call quality may be an indication that the number of participants in the conference call is causing the call moderator to become overloaded. Off-loading such processing from the call moderator to a number of domestic focus nodes is advantageous because it should ease the burden being placed on the overall call moderator and should thus lead to an improvement in call quality and participant satisfaction.

In another embodiment, call quality is not the trigger for grouping of participants. Rather the number of participants taking part in the conference call is determined and grouping occurs if this number exceeds a predetermined threshold. The threshold is preferably chosen such that grouping can occur before the conference call moderator becomes overloaded and therefore before conference call quality starts to suffer. For example, previous experience may dictate that calls with more than 200 participants start to exhibit call quality problems and with this in mind grouping may take place when the number of participants reaches 180. It will be appreciated however that factors such as the specification of the conference call moderator node may make a difference and such factors can be built into an algorithm which decides when to start grouping participants.

It will be appreciated that the grouping may be performed up-front before the conference call gets properly underway, but equally may occur in the middle of a call—for example if call quality starts to suffer, maybe as a result of additional participants coming on board.

In a preferred embodiment, participants are grouped by physical adjacency. For example based on their IP address. It makes sense to group those participants that are located near to each other because then the communication taking place between each participant and the domestic focus does not have to follow a long and complicated route which would add a possibly unacceptable time delay and therefore affect call quality and result in user dissatisfaction.

In one embodiment, the call moderator identifies that a group is overloaded and sub-groups are then created within the overloaded group. A participant is identified within each sub-group to act as a sub domestic focus and is notified of its assigned role. For each sub-group, the call moderator disconnects from all participants in that group except for the participant that has been assigned the role of sub domestic focus and for each sub-group, the call moderator routes the conference call through the sub domestic focus who preferably does all the conference call processing (e.g., coding, decoding and modulation). In this embodiment, the originally assigned domestic focus may become a sub domestic focus of a new sub group or may step down entirely. The original group may therefore no longer exist at all.

There is provided a computer-implemented method, system and computer program product for a participant in a conference call to act as a domestic focus for a group of co-located participants. Notification is received from a conference call moderator of a participant's new domestic focus status. The domestic focus initiates a connection with each participant in the same group as the domestic focus. The domestic focus maintains a connection to the conference call moderator and for each participant in the same group as the domestic focus, the domestic focus performs conference call processing and communicates with the conference call moderator.

In one embodiment, the domestic focus identifies that their group is overloaded. This may be as a result of a degradation in call quality or it may be that the number of participants is at a level which historically has caused this (or similar) DF's problems in the past. The domestic focus creates a plurality of sub-groups within the overloaded group and notifies each sub domestic focus of their assigned role. For each sub-group, the domestic focus disconnects from all participants in the group except for the participant that has been assigned the role of sub domestic focus. For each sub-group, the domestic focus routes the conference call through the sub domestic focus who preferably does all the conference call processing for the participants in its sub-group. This means that the sub domestic focus removes some of the load from the domestic focus. The domestic focus may still keep some participants for which it does conference call processing, may become a sub domestic focus or may step down entirely.

BRIEF DESCRIPTION OF THE DRAWINGS

Preferred embodiments of the present invention will now be described, by way of example only, with reference to the following drawings, in which.

DETAILED DESCRIPTION

Figure 1:
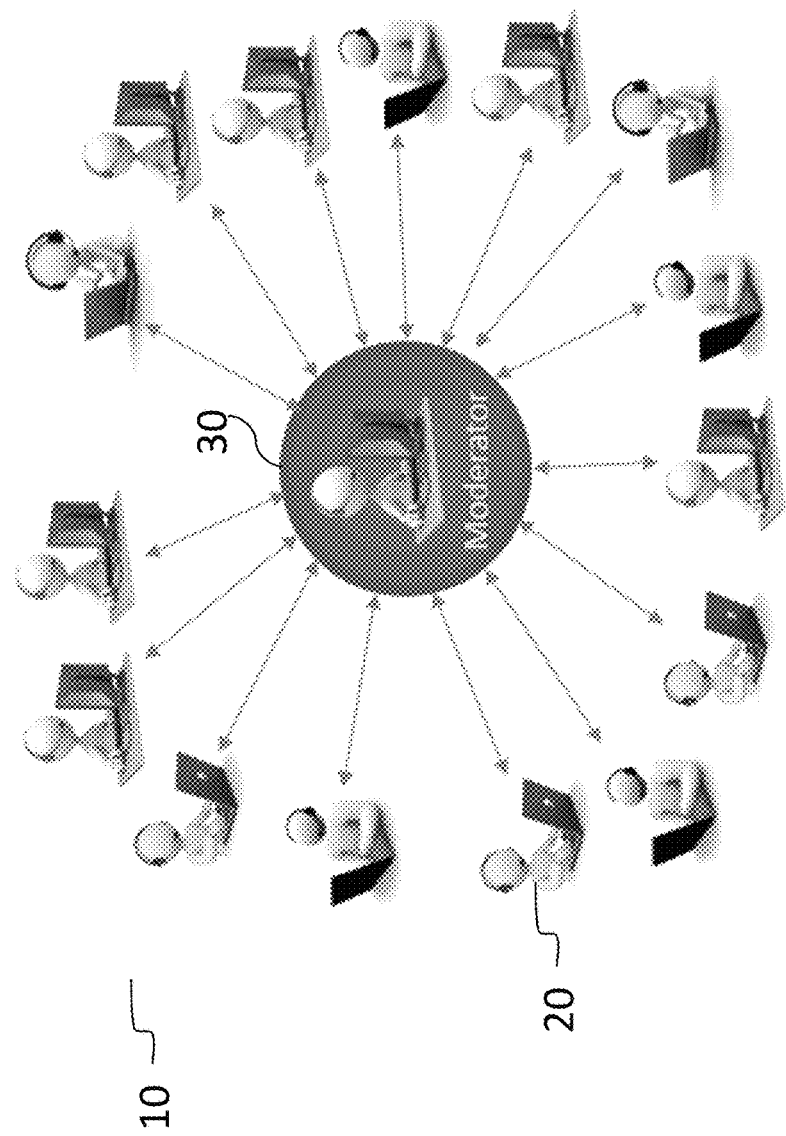
FIG. 1 illustrates a typical centralized conference call with a plurality of participants from different location.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. a computer-implementable method. The various steps of the method therefore reflect various parts of a computer program, e.g., various parts of one or more algorithms.

The solution presented herein discloses a mechanism which attempts to maintain a best achievable call quality as the number of call participants increases.

The present invention, in accordance with a preferred embodiment, is particularly concerned with the following scenario:

A conference call with large number of participants, e.g., in the case of educational sessions, notable speakers, all-hands meetings, remote round table meetings, etc.

The participants in the conference call are dialing in from different physical locations.

The conference call is using a centralized VoIP topology.

The large number of participants in a call would eventually have a negative effect on the call quality. This is because the focus (moderator) system and network resources involved in providing the underlying call infrastructure would likely be overloaded such that it is would not be feasible to maintain the same call quality. Moreover, the overall bandwidth and network traffic could cause a reduction in QoS which may make participation in a conference call difficult and result in user dissatisfaction.

FIG. 1 shows a typical centralized conference call architecture 10 with plurality of participants 20 from different locations. All participants are connected directly to the call central moderator 30 (the focus) and an application (conferencing software) will typically be installed on every single connected node, including the participants and also the moderator. For a small number of participants, this will in all likelihood work fine with an acceptable Quality of Service. However, when the number of participants grows over a certain limit, the call quality may reduce due to the processing of too many call participants.

The present invention, in accordance with preferred embodiments, attempts to address this situation.

Figure 2:
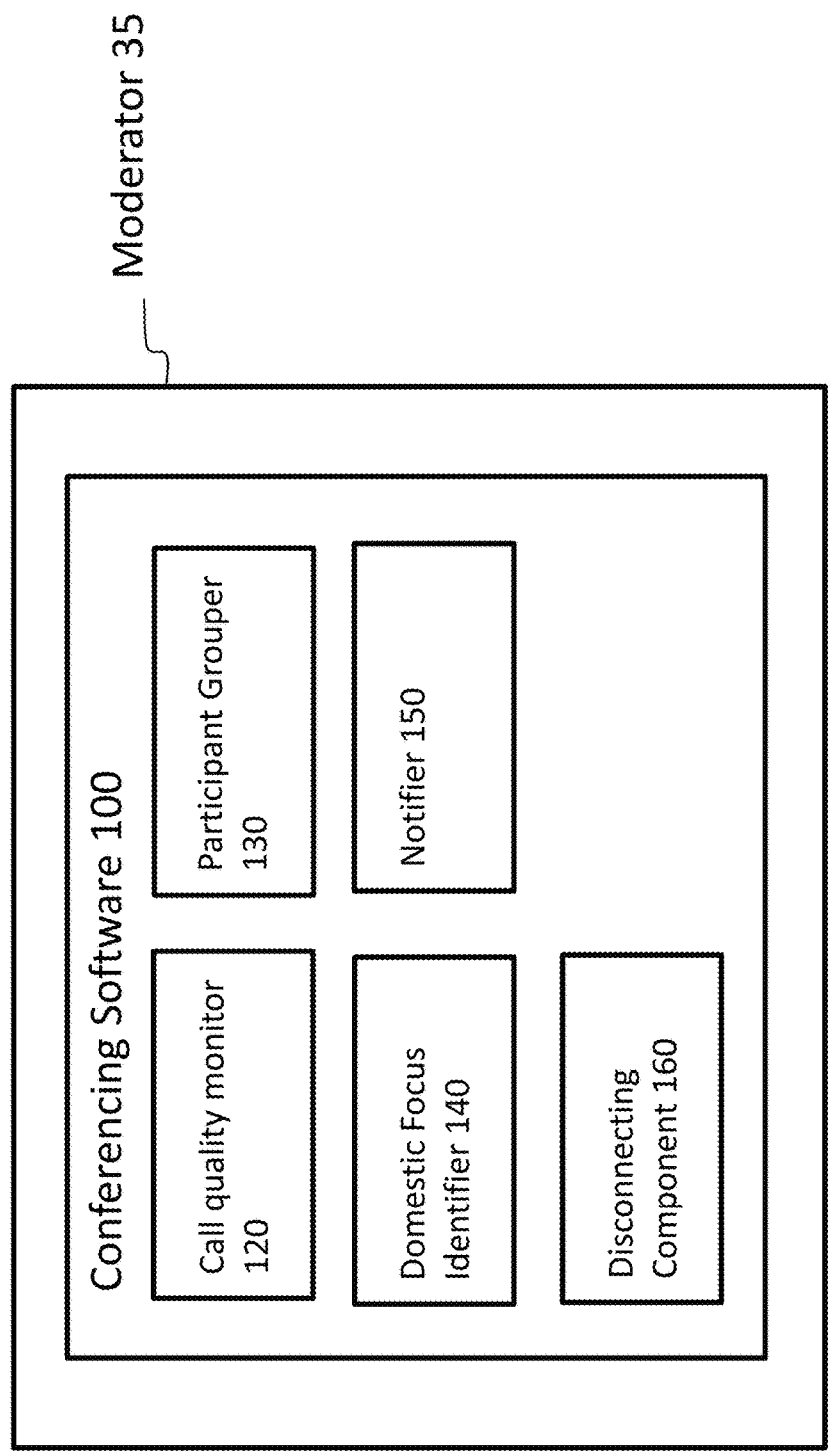
FIG. 2 shows, in accordance with a preferred embodiment of the present invention, componentry running on a conference call moderator node.
Figure 3A:
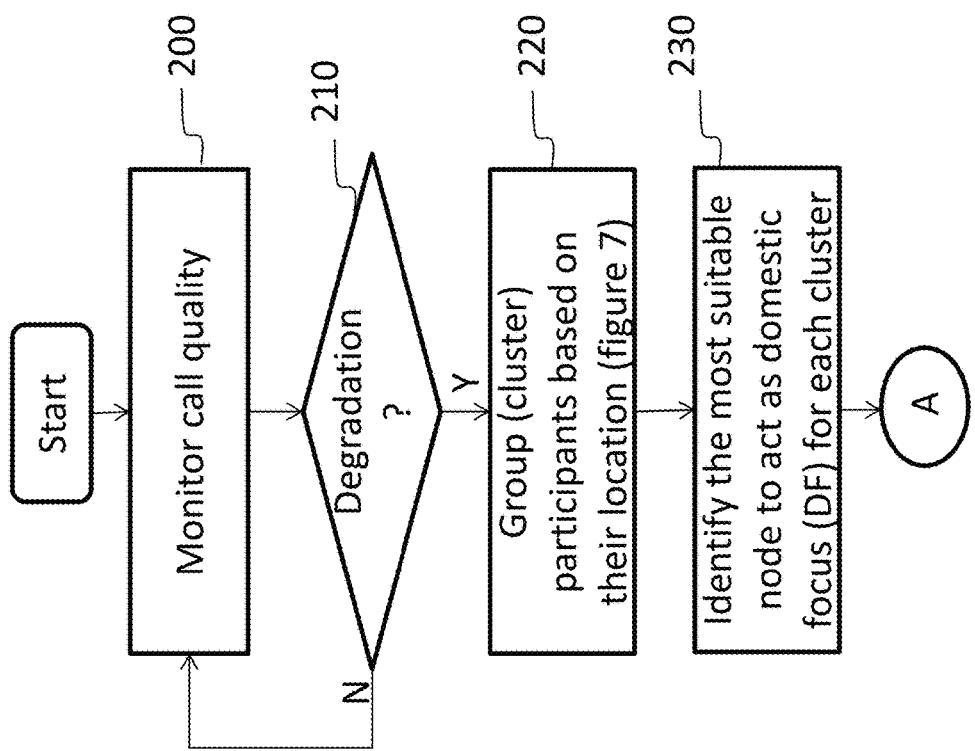
FIGS. 3a and 3b show, in accordance with a preferred embodiment of the present invention, the processing performed by the conference call moderator node.

FIG. 2 shows exemplary componentry for conferencing software residing on the moderator node. This figure should be read in conjunction with FIGS. 3a and 3b which illustrate the processing performed by the moderator node in accordance with a preferred embodiment.

The conferencing software will detect via a QoS assessment algorithm (such as is known in the prior art) that the increase of the number of participants has started to cause degradation in call quality. In one embodiment, call quality will be monitored by conferencing software 100 running on the moderator node 35. In an alternative embodiment, a participant node may report back to the moderator that call quality has dropped below an acceptable threshold. The moderator node may then decide to act upon a single notification, may investigate the situation further itself, or may wait for a pre-defined number of notifications before taking action.

Figure 7:
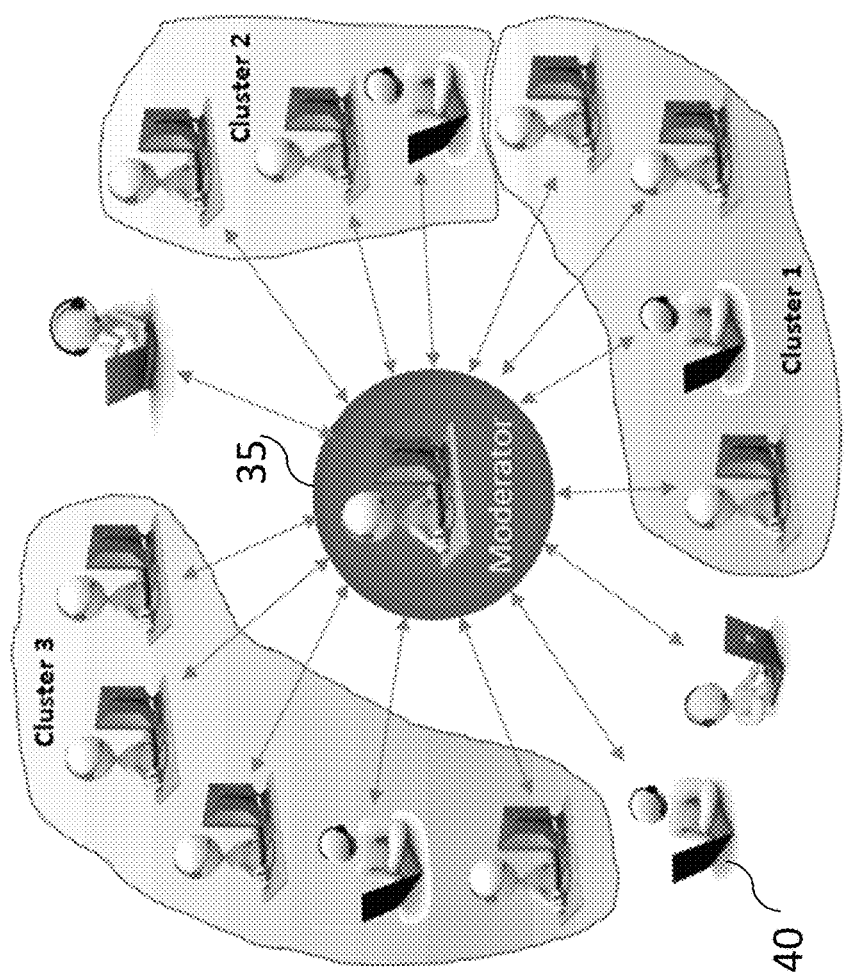
FIG. 7 provides an overview of the scenario in which participants are grouped (clustered) by physical adjacency to each other, in accordance with a preferred embodiment of the present invention.

In the preferred embodiment, conferencing software 100, running on moderator 35, includes call quality monitor 120. Component 120 monitors call quality at step 200. If it is determined at step 210 that call quality has worsened (degraded), participant grouper 130 assesses the locations of all connected participants. This could be done with any of various prior art methods such as identifying the location from the source IP address. Once the locations of all participants are identified, the participant grouper 130 groups all participants fulfilling a specific criterion of physical location adjacency into one cluster (group). This is further shown in FIG. 7. Here moderator 35 has created three clusters (groups) 1, 2, and 3. Each cluster should preferably contain at least three participants and as a result there may be one or more individuals (isolated nodes) 40.

Once this logical clustering is determined, domestic focus identifier 140 identifies (at step 230) the most suitable node (participant) to take the role of domestic focus (DF) or local moderator for each cluster. This choice is based on prior art methods that choose the DF based on the best suitable hardware and codec capabilities. The following document, Adel, M. et al., "Improved E-model for monitoring quality of multi-party VoIP communications," Globecom Workshops (GC Wkshps), 2013 IEEE, pgs. 1180-1185, Dec. 9-13, 2013, INSPEC Accession Number 14350905, provides one example of this.

A node may have previously specified that it is willing to act as a DF and selection takes place from amongst such nodes. A system check may have been performed on a node to determine whether it is suitable (e.g., has sufficient processing power). This may occur when the node downloads conferencing software. Indeed a DF may download conferencing software with the appropriate additional functionality (or all nodes may download the same software). Even when a DF is chosen, in one embodiment, the DF has the option to refuse. For example, if the DF is already performing another computationally intensive task. This is not shown in the figures and for the purpose of discussion, it is assumed that the selected DF accepts its new role.

Figure 3B:
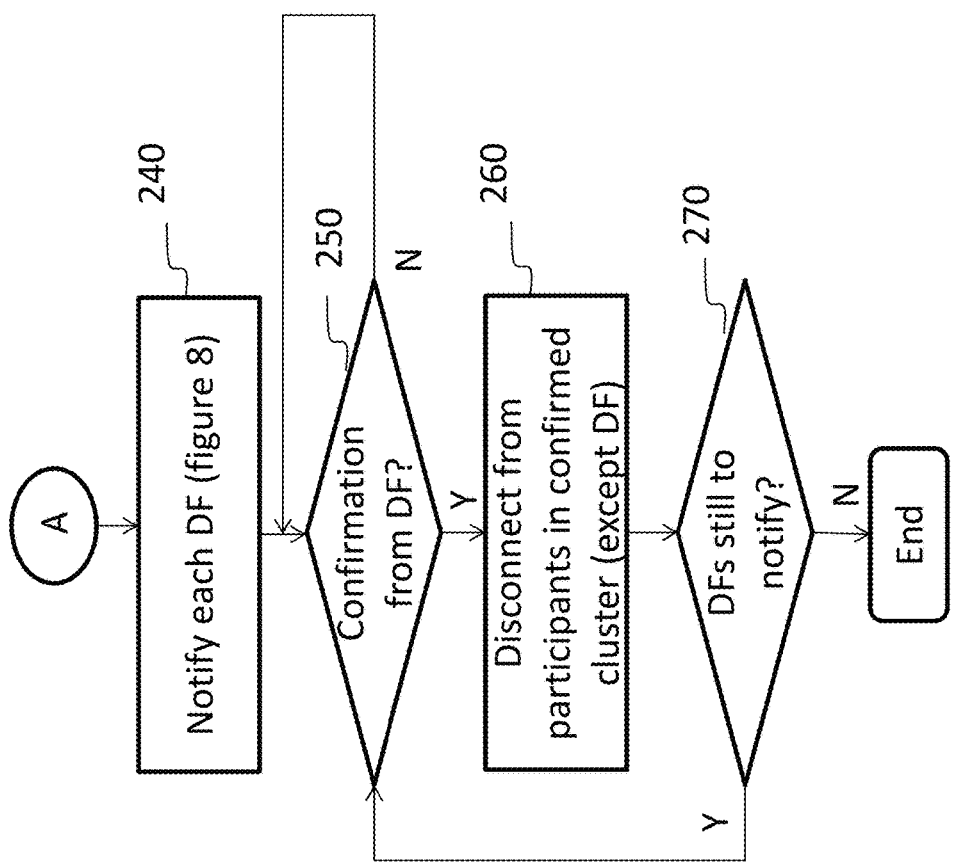
Figure 8:
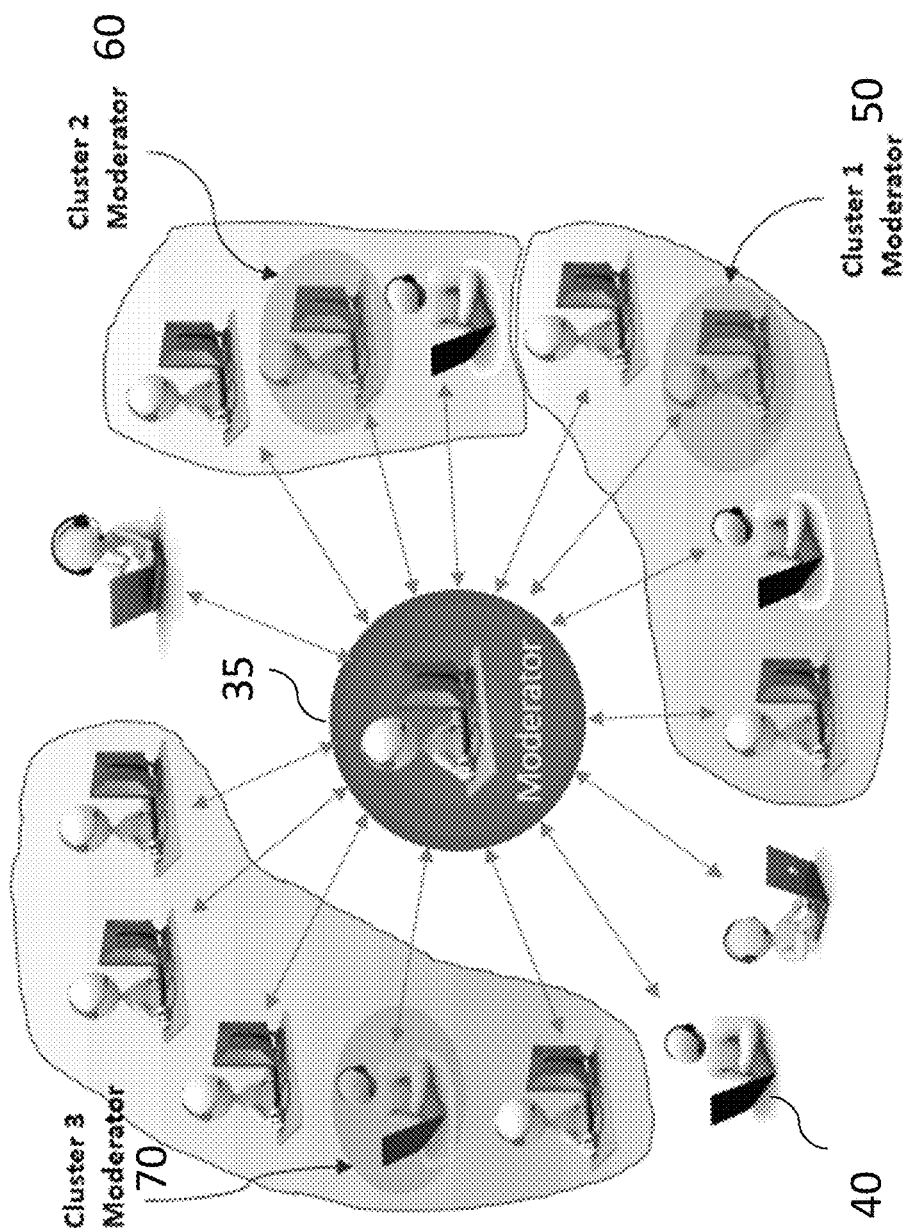
FIG. 8 provides a high-level illustration of a Domestic Focus being assigned to each cluster, in accordance with a preferred embodiment of the present invention.

Processing then moves via A to FIG. 3b and notifier 150 then notifies the chosen DF at step 240 that they should take on the role of domestic processing for the conference call for all participants located in the particular cluster. This is shown further in FIG. 8. Here it can be seen that moderator 35 has identified a cluster moderator (DF) for each cluster. Cluster 1's DF is node 50, cluster 2's DF is node 60 and cluster 3's DF is node 70.

Figure 4:
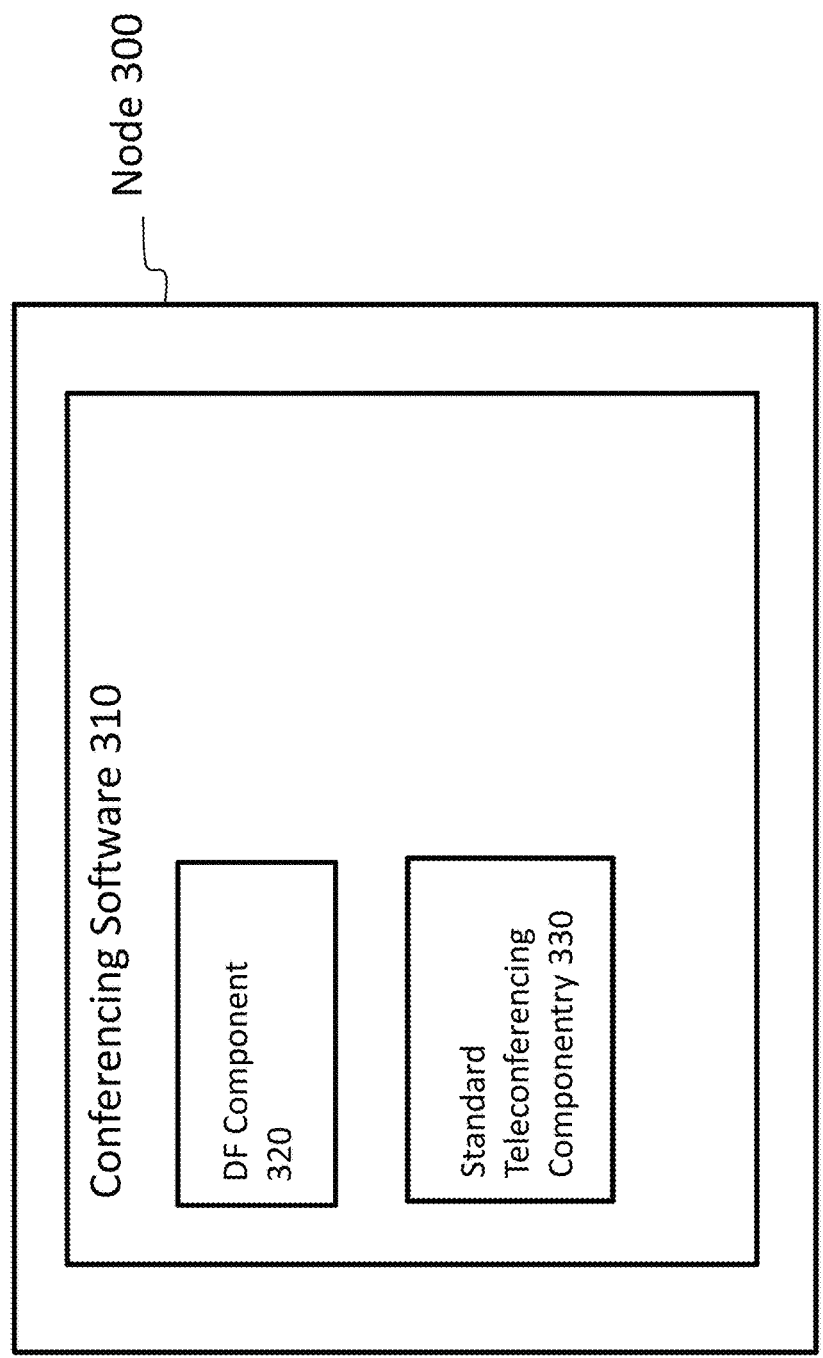
FIG. 4 illustrates, in accordance with a preferred embodiment of the present invention, the componentry running on conference call participant nodes.
Figure 5A:
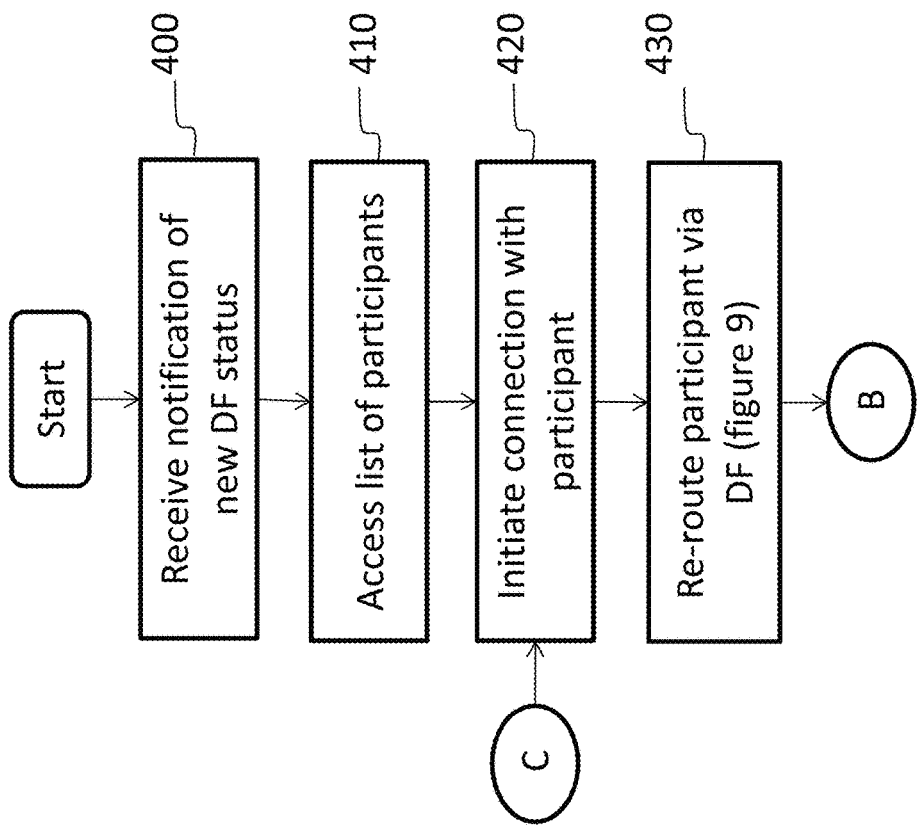
FIGS. 5a and 5b illustrate, in accordance with a preferred embodiment of the present invention, the processing performed by a Domestic Focus (DF) node.
Figure 5B:
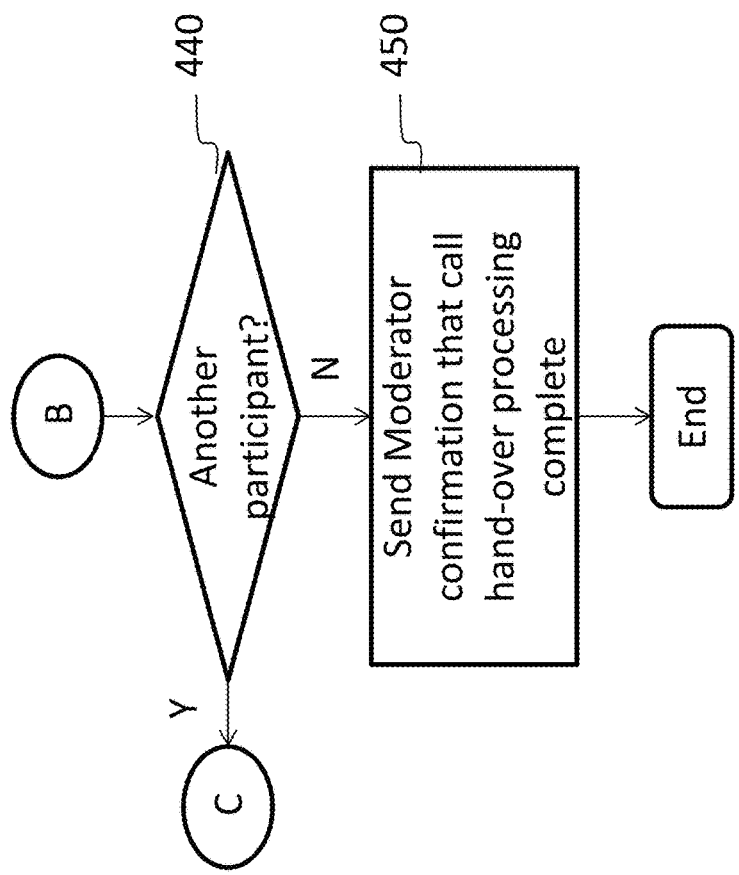

FIG. 4 illustrates, in accordance with a preferred embodiment, the componentry on each of the nodes in a cluster. FIGS. 5a and 5b show the processing performed by a DF node in accordance with a preferred embodiment.

Each conference call participant node 300 comprises conferencing software 310. Conferencing software 310 comprises standard teleconferencing componentry 330 and a DF component 320. When a node 300 is identified as the new DF for a cluster, that node (component 320) receives notification of its new status at step 400. In a preferred embodiment, the DF is provided with a list of participants that they should serve as a domestic focus for. In an alternative embodiment, DF component 320 requests such a list from the moderator 35. In another embodiment, the moderator indicates (in the notification, or upon request) from where such information is to be found.

Figure 9:
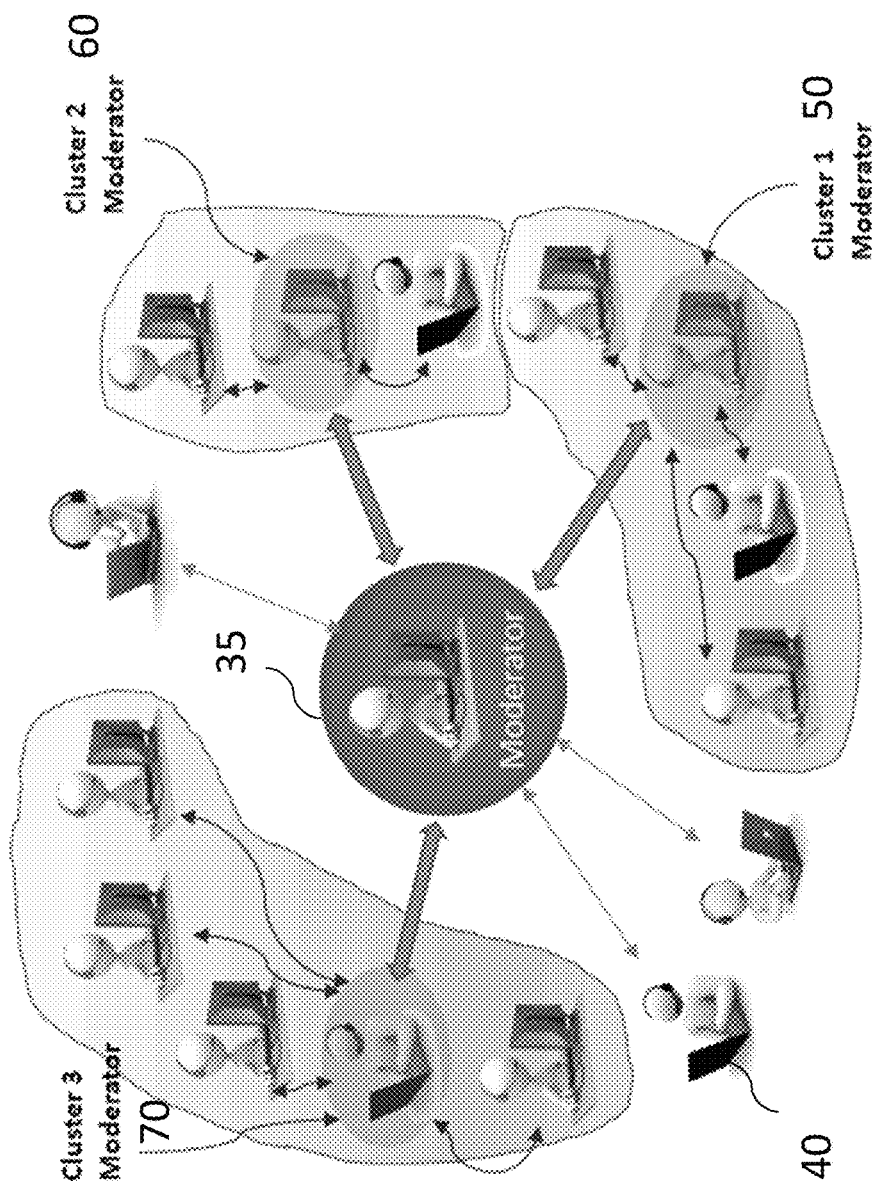
FIG. 9 provides a high-level illustration of all participants in a cluster being rerouted through their assigned Domestic Focus, in accordance with a preferred embodiment of the present invention.

At step 410, DF component 320 accesses the list of participants and then initiates a connection with each participant and re-routes that participant's call via itself (steps 420, 430, 440). An overview of this is shown in FIG. 9. Please see in particular cluster 3 where the arrows depict that all the participants in cluster 3 are now being routed via cluster 3's moderator (DF) 70.

Once a cluster's DF has rerouted each cluster's participants via itself, then it (component 320) can send the moderator 35 confirmation that call hand-over processing is complete for that cluster (step 450). Standard conference call processing then continues (component 330). This means that all the call processing (e.g., coding/decoding/modulation etc.) for each cluster (group) is preferably done locally by that cluster's DF.

Returning now to the processing performed by moderator 35 and FIG. 3b, confirmation is received (step 250) from each DF once it has performed call hand-over processing. Disconnecting component 160 then disconnects from the participants in a confirmed cluster (except for the DF) at step 260. Processing continues to loop round (steps 270, 250, 260) until all DFs have notified. Processing then ends.

As previously indicated, some nodes may be connected in isolation from remote locations with no or only one adjacent participants. Because a cluster should only contain at least three or more participants, such isolated nodes are kept connected as normal to the conference call central moderator.

It should be appreciated that in some embodiments only certain nodes are eligible to be selected as a DF. Such nodes may simply be those which are running the appropriate componentry (e.g., component 320). Preferably only capable nodes run such software in the first place. The moderator may be pre-notified with respect to such nodes.

The division of conference call participants into clusters, each with their own local moderator (DF) minimizes the number of call connections and therefore will advantageously significantly minimize network traffic. Minimizing number of connections will also significantly reduce processing overhead and burden on the moderator (focal node). This could imply using cheaper moderator hardware without affecting the call quality. Further, doing call processing locally for each cluster for physically adjacent participants would reduce the latency of long distance transmission which would imply a better overall call quality.

In one embodiment, grouping of participants is not responsive to a degradation in call quality. In this embodiment, a decision is taken up front to group participants based on the number of participants involved in a conference call. Thus, for example, if the number of participants exceeds a certain (predetermined) threshold (and therefore call quality is in danger of starting to suffer), then it may be seen as sensible to split the call handling by grouping participants.

Sometimes the clusters are not balanced in terms of number of participants for each cluster (group). Consider the case of a conference call between a moderator in the US and different participants worldwide. By way of example only, the location-based clustering of the participants might yield, amongst other clusters, a cluster of users dialing in from country X that contains 100's participants. Please see FIG. 10. The processing of this number of participants as a single cluster could be a significant overhead on the domestic focus for the group from country X that would significantly affect the call quality.

Figure 11:
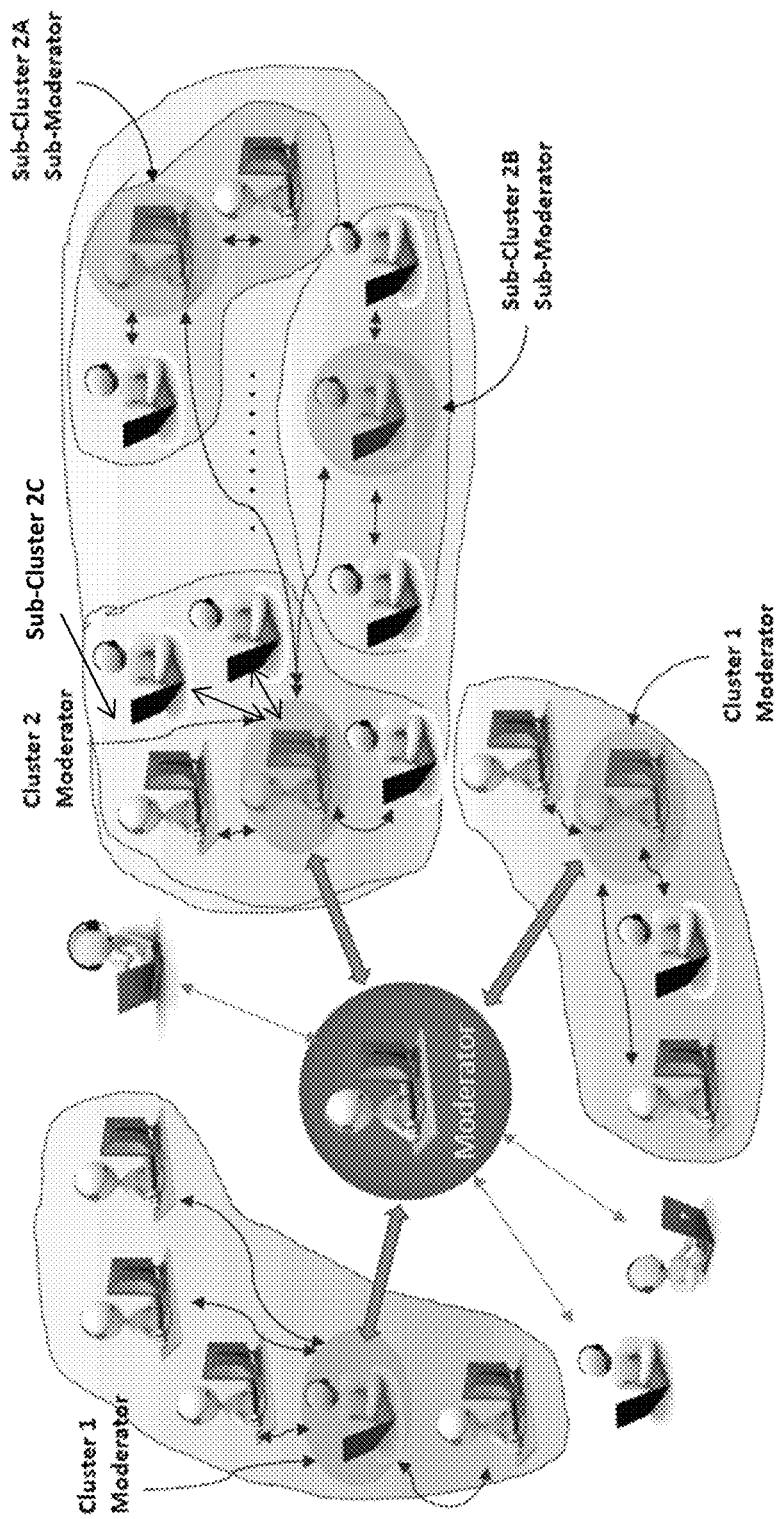

The present invention, in accordance with a preferred embodiment, introduces the concept of a 'recursive domestic focus'. Accordingly, processing takes place to further sub-cluster (sub-group) the cluster participants from country X. This would yield for example 3 or 4 sub-clusters all within the larger cluster. A high-level overview is shown in FIG. 11 in which cluster 2 has been further sub-divided into sub-clusters 2A, 2B and 2C. Sub-clustering may again be based on physical adjacency, this time at a more granular level. Thus there may, in one embodiment, be one or more isolated nodes (not shown).

Figure 6A:
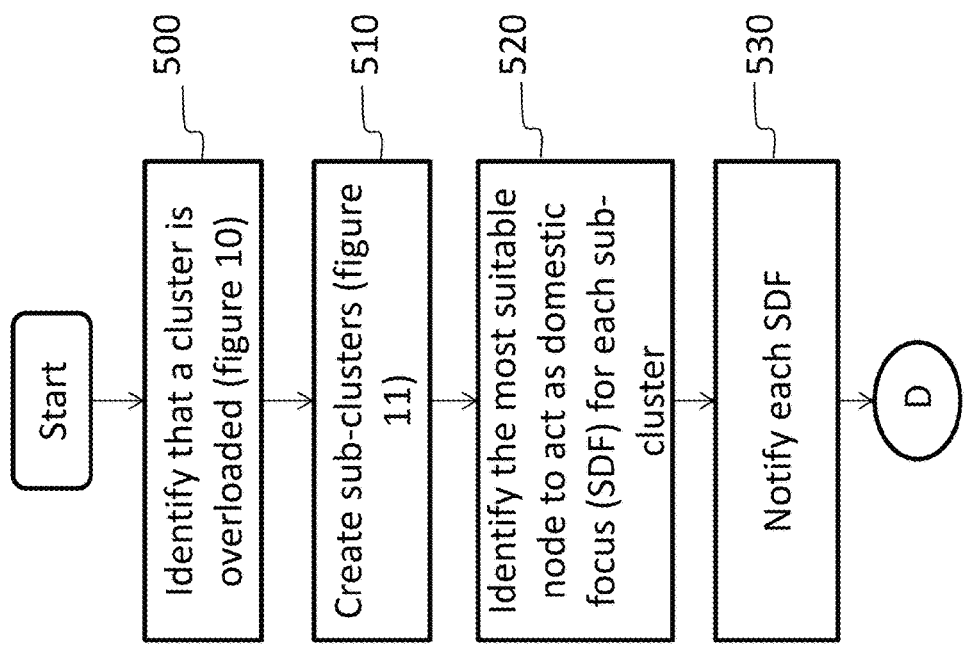
FIGS. 6a and 6b show, in accordance with a preferred embodiment of the present invention, the processing performed in order to further sub-divide a cluster.
Figure 6B:
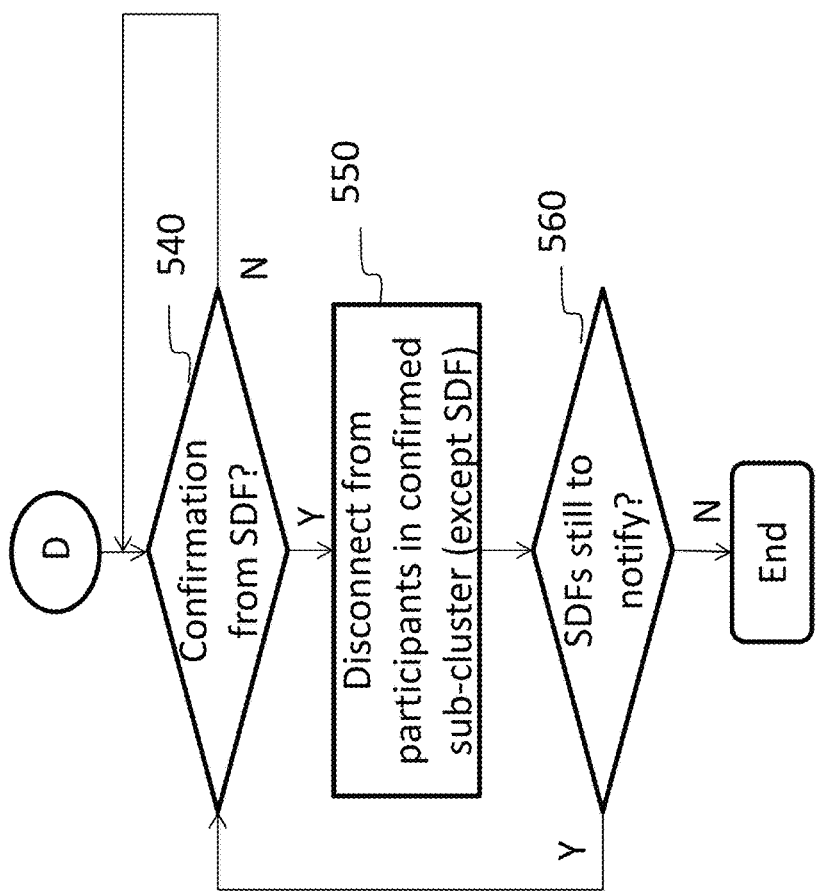
Figure 10:
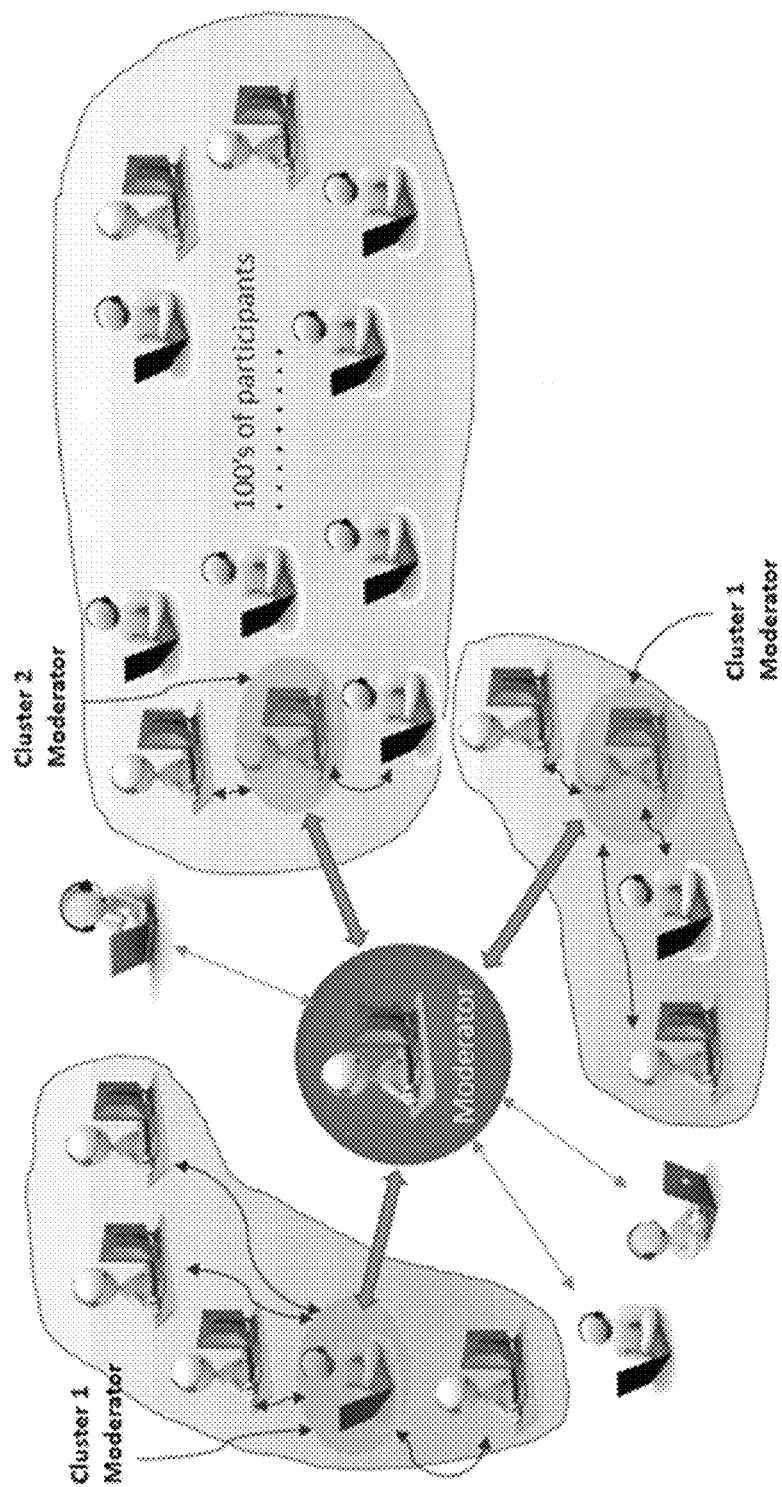
FIGS. 10 and 11 provide high-level overviews of the scenario described by FIGS. 6a and 6b, in accordance with a preferred embodiment of the present invention.

The recursive domestic focus processing is shown in more detail, in accordance with a preferred embodiment, in FIGS. 6a and 6b. It is identified at step 500 that a cluster is overloaded (FIG. 10). Such an identification is preferably made by that cluster's DF which in this embodiment has a call quality monitoring component (not shown). The DF then creates a plurality of sub-clusters at step 510 (FIG. 11). Such sub-clusters are preferably created on the basis of physical adjacency and there may be a maximum number of participants permitted per cluster. The most suitable node to act as domestic focus (SDF) for each sub-cluster is then identified at step 520. In another (less preferred) embodiment the sub-clustering functionality and identification of an SDF may be provided (upon request) by the conference call moderator 35. Irrespective of embodiment, each SDF is then notified at step 530. Processing then proceeds via D to FIG. 6b.

The DF for the cluster concerned waits for confirmation (at step 550) from the identified SDF that they have taken over call-handling for the participants within their sub-cluster and then disconnects from all participants in a confirmed sub-cluster, except for the SDF itself (step 550). Processing continues until all SDFs have notified (step 560). The processing that is performed by the SDF itself will not be described in detail since it is the same as that performed by the DF when it is first notified of its new role within a cluster (FIGS. 5a and 5b, except that the SDF is communicating with the cluster's DF, rather than the conference call moderator).

Each SDF will perform standard conference call processing (coding/decoding/modulation etc.) for all participants in an SDF's sub-cluster.

Thus, in this embodiment, each sub-cluster will have one connection to its parent cluster (the DF) and each parent cluster will have one connection to the overall conference call moderator. This is achievable because each sub-cluster has a sub-moderator and each sub-moderator has a single connection to a cluster moderator, who then has a connection to the conference call moderator.

A domestic focus may have participants for which it directly performs all the necessary conference call processing—i.e. certain participants do not go via an SDF. These may, for example, be participants who do not easily fall into any of the newly created sub-groups (e.g., because they are not physically co-located with such sub-groups) or participants who are physically co-located with the DF.

Advantageously, using this mechanism, it is preferably possible to virtually multiplex thousands of participants in the same conference call without affecting overall call quality.

In one embodiment, when a node installs conferencing software it can specify whether it is able to act as a domestic focus should the need arise. When the software is installed it may in the first instance perform a check to determine if the node has sufficient capability. In another embodiment, a capability check may be performed separately.

A call participant has the option to refuse a request for it to become a domestic focus. This may be because it is performing some computationally intensive task at the time of the request.

In another embodiment, an overloaded cluster is subdivided with each sub-cluster being assigned an SDF which communicates directly with the overall conference call moderator. In this embodiment, the original DF for the cluster may be step down entirely (and become an ordinary participant again) or may be assigned the role of SDF for a sub-cluster.

Figure 12:
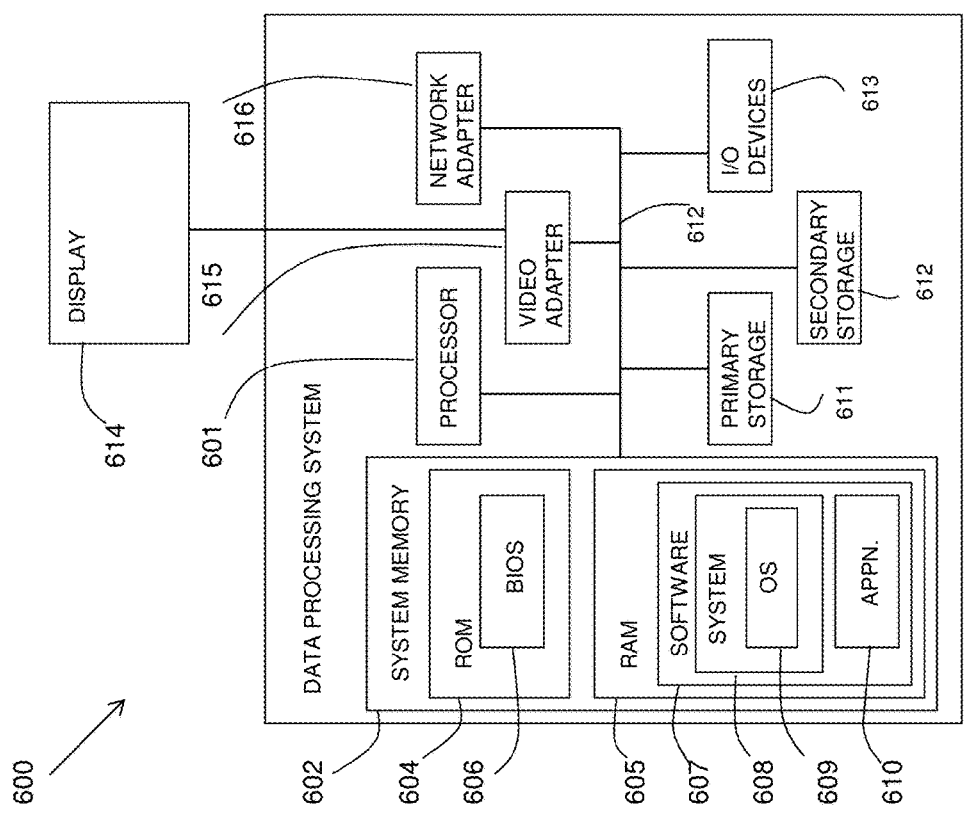
FIG. 12 is a block diagram of an embodiment of a computer system in which the present invention may be implemented.

Referring to FIG. 12, an exemplary system for implementing embodiments of the invention includes a data processing system (moderator/conference call participant) 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method for conducting a conference call between a plurality of participants using a conferencing computer hardware system, comprising:
   generating, by location, the plurality of participants into a plurality of separate groups;
   identifying a plurality of domestic focuses from the plurality of participants;
   disconnecting, from the conference call by the conferencing computer hardware system, those of the plurality of participants not selected as a domestic focus; and
   routing, by the conference computer hardware system, the conference call only through the plurality of domestic focuses, wherein
   a single domestic focus is assigned to each of the plurality of separate groups.

2. The method of claim 1, wherein
   degradation in call quality of the conference call is monitored for.

3. The method of claim 2, wherein
   the grouping occurs after the conference call has been initiated.

4. The method of claim 1, wherein
   the grouping is based upon a number of the plurality of participants exceeding a predetermined threshold.

5. The method of claim 1, further comprising:
   identifying, as being overloaded, a group within the plurality of separate groups;
   creating a plurality of separate sub-groups within the overloaded group; and
   identifying a plurality of sub domestic focuses from a plurality of participants in the overloaded group; and
   routing, for each of the plurality of sub-groups, the conference call through the sub domestic focus respectively assigned to each of the plurality of sub-groups.

6. The method of claim 1, wherein
   the plurality of domestic focuses are identified based upon hardware and codec capability.

7. The method of claim 1, further comprising:
   sending, to each of the plurality of domestic focuses, a list of the plurality of participants in the group respectively associated with each of the plurality of domestic focuses.

8. A conferencing computer hardware system configured to conduct a conference call between a plurality of participants, comprising:
   a hardware processor configured to perform:
      generating, by location, the plurality of participants into a plurality of separate groups;
      identifying a plurality of domestic focuses from the plurality of participants;
      disconnecting, from the conference call, those of the plurality of participants not selected as a domestic focus; and
      routing the conference call only through the plurality of domestic focuses, wherein
   a single domestic focus is assigned to each of the plurality of separate groups.

9. The system of claim 8, wherein
   degradation in call quality of the conference call is monitored for.

10. The system of claim 9, wherein
    the grouping occurs after the conference call has been initiated.

11. The system of claim 8, wherein
    the grouping is based upon a number of the plurality of participants exceeding a predetermined threshold.

12. The system of claim 8, wherein the hardware processor is further configured to perform:
    identifying, as being overloaded, a group within the plurality of separate groups;
    creating a plurality of separate sub-groups within the overloaded group; and
    identifying a plurality of sub domestic focuses from a plurality of participants in the overloaded group; and
    routing, for each of the plurality of sub-groups, the conference call through the sub domestic focus respectively assigned to each of the plurality of sub-groups.

13. The system of claim 8, wherein
    the plurality of domestic focuses are identified based upon hardware and codec capability.

14. The system of claim 8, wherein the hardware processor is further configured to perform:
    sending, to each of the plurality of domestic focuses, a list of the plurality of participants in the group respectively associated with each of the plurality of domestic focuses.

15. A computer program product, comprising:
    a computer readable storage medium having stored therein program instructions for conducting a conference call between a plurality of participants,
    the program instructions, which when executed by a conferencing computer hardware system, cause the conferencing computer hardware system to perform:
       generating, by location, the plurality of participants into a plurality of separate groups;
       identifying a plurality of domestic focuses from the plurality of participants;
       disconnecting, from the conference call, those of the plurality of participants not selected as a domestic focus; and
       routing the conference call only through the plurality of domestic focuses, wherein
    a single domestic focus is assigned to each of the plurality of separate groups.

16. The computer program product of claim 15, wherein degradation in call quality of the conference call is monitored for.

17. The computer program product of claim 16, wherein the grouping occurs after the conference call has been initiated.

18. The computer program product of claim 15, wherein the grouping is based upon a number of the plurality of participants exceeding a predetermined threshold.

19. The computer program product of claim 15, wherein the program instructions further cause the conferencing computer hardware system to perform:
 identifying, as being overloaded, a group within the plurality of separate groups;
 creating a plurality of separate sub-groups within the overloaded group; and
 identifying a plurality of sub domestic focuses from a plurality of participants in the overloaded group; and
 routing, for each of the plurality of sub-groups, the conference call through the sub domestic focus respectively assigned to each of the plurality of sub-groups.

20. The computer program product of claim 15, wherein the plurality of domestic focuses are identified based upon hardware and codec capability.

* * * * *